July 10, 1951
L. KENNON
2,560,114
PIPE FITTING
Filed Feb. 14, 1949
2 Sheets-Sheet 1
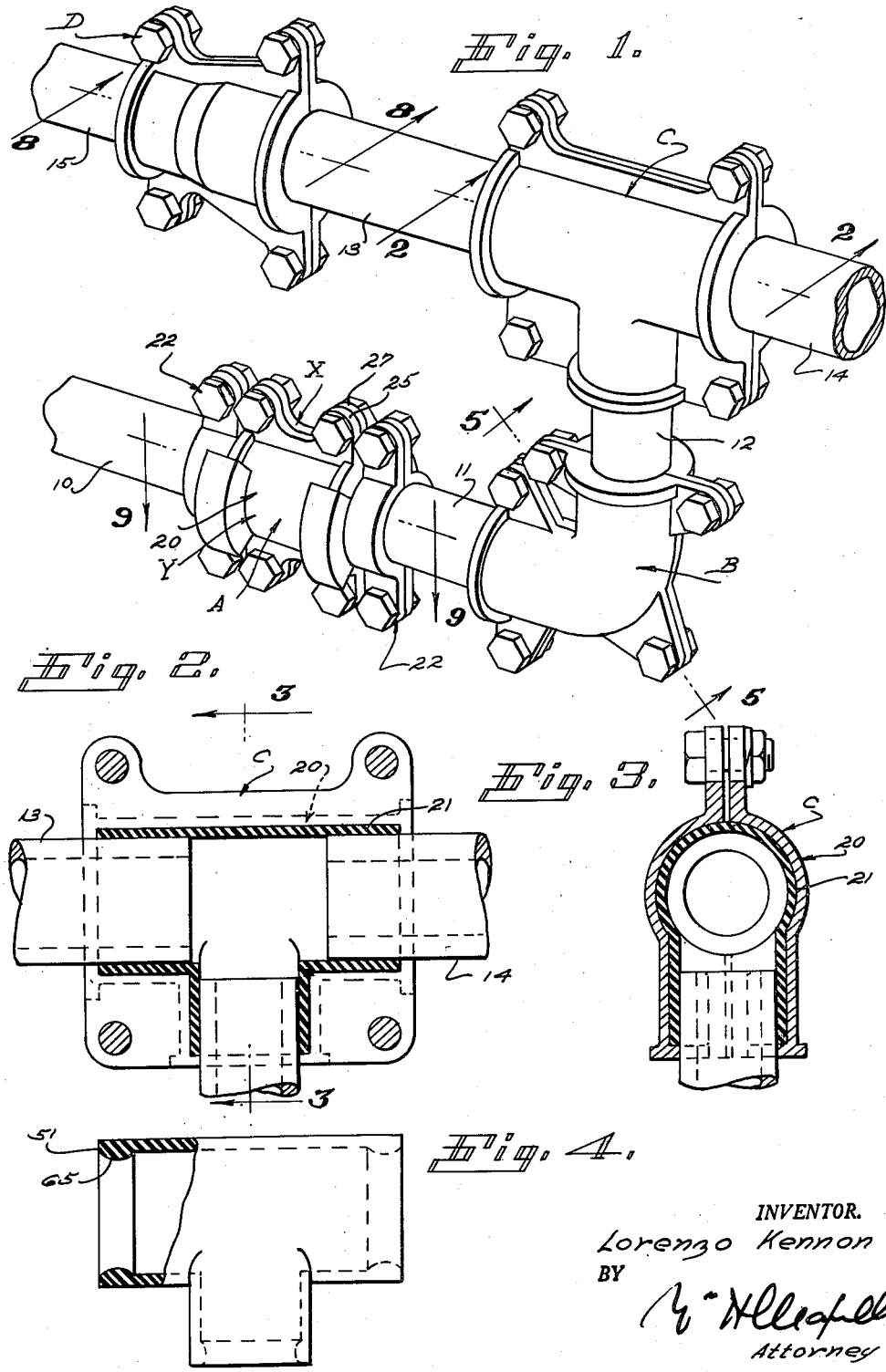
INVENTOR.
Lorenzo Kennon
BY
Attorney

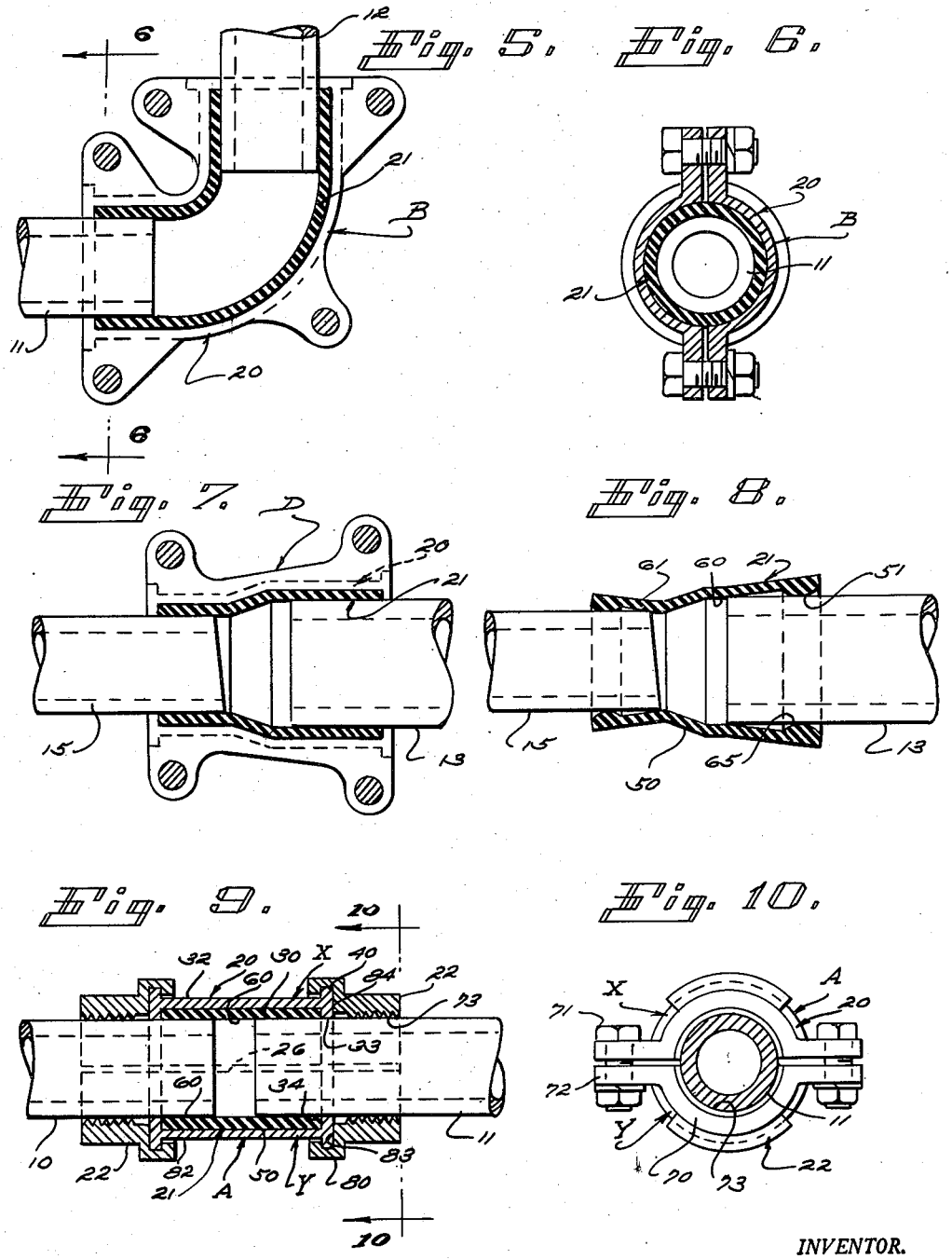

Patented July 10, 1951

2,560,114

UNITED STATES PATENT OFFICE 2,560,114

PIPE FITTING

Lorenzo Kennon, Burbank, Calif., assignor of one-half to William S. Schwartz, Glendale, Calif.

Application February 14, 1949, Serial No. 76,277

2 Claims. (Cl. 285—195)

This invention is concerned with a pipe fitting or coupling and has to do, generally, with a structure serving to connect or couple tubular parts such as pipe or tubing and acts to effectively hold such parts together and in predetermined relation, and further serves as an effective seal preventing leakage at the point where such parts are connected. It is a general object of the present invention to provide a structure of the general character referred to which is of simple, practical, inexpensive construction, which is simple and convenient to use or operate, and which is highly dependable and effective in action.

The ordinary pipe coupling involves threads, usually tapered threads, provides a metal to metal contact between the pipe parts exposed to the fluids or materials handled by the pipe, requires axial movement between the pipe parts during engagement or release, and is by no means a wholly dependable or effective seal against leakage, since it relies to a large extent upon the application of sealing compounds at the threaded parts and upon very tight engagement of the threads. The usual connector provided for coupling tubing involves mere frictional clamp action or a combination of a friction clamp and a packing construction or gland, all of which is generally expensive of construction, cumbersome in operation and often not dependable or secure.

It is a general object of this invention to provide a fitting or coupling for pipe tubing or like parts, which joins the parts through or by means of a metallic body having direct gripping engagement with the connected parts and which provides a seal preventing leakage from between the parts and which serves to effectively prevent moisture or material handled by the connected parts from reaching the points where the metal body engages the connected parts. Through the construction provided by the present invention an effective, dependable grip or coupling is established, a tight permanent seal is established and maintained, and the construction is such as to be practically free of electrolytic action such as frequently occurs in ordinary pipe connections.

It is another object of this invention to provide a fitting or coupling of the general character referred to which includes a seal having tight engagement with the connected parts when the structure is set so that the parts are clamped together, which seal acts to tighten as pressure is applied to it by the fluid handled by the connected parts.

Another object of the invention is to provide a structure of the general character referred to in which the elements are of simple, inexpensive construction and which lends itself to practical incorporation in simple, straight couplings, T-couplings, L-couplings, reducers, and various other such fittings.

It is another object of the invention to provide a fitting or coupling of the general character referred to including auxiliary or supplemental gripping means which may be employed at each end of the main body of the structure and which serves to provide a firm, dependable mechanical grip preventing axial movement of the connected parts.

The various objects and features of my invention will be fully understood from the following detailed description of typical preferred forms and applications of the invention, throughout which description reference is made to the accompanying drawings, in which:

Fig. 1 is a perspective view of an assembly or manifold formed of a plurality of tubular parts such as pipe sections joined by or involving fittings each of which embodies the present invention, the structure shown including a fitting in the form of a reducer, a fitting in the form of a T, a fitting in the form of an L, and a fitting in the form of a straight coupler. Fig. 2 is an enlarged detailed sectional view taken at the T-fitting shown in Fig. 1, being a view taken as indicated by line 3—3 on Fig. 1. Fig. 3 is a transverse sectional view of the structure shown in Fig. 2, being a view taken as indicated by line 3—3 on Fig. 2. Fig. 4 is a side elevation of the seal shown in Figs. 2 and 3, illustrating it with a part broken away to show in section. Fig. 5 is a longitudinal detailed sectional view of the L-fitting shown in Fig. 1, being a view taken in the direction indicated by line 5—5 on Fig. 1. Fig. 6 is a transverse sectional view taken as indicated by line 6—6 on Fig. 5. Fig. 7 is a longitudinal sectional view of the reducer illustrated in Fig. 1, being a view taken as indicated by line 7—7 on Fig. 1. Fig. 8 is a view of structure shown in Fig. 7, showing the body of the fitting removed and showing the manner in which the seal is engaged with the connected parts prior to the body being applied. Fig. 9 is a longitudinal sectional view of the straight coupling illustrated in Fig. 1, being a view taken as indicated by line 9—9 on Fig. 1, and Fig. 10 is a transverse sectional view taken as indicated by line 10—10 on Fig. 9.

The structure provided by the present invention is useful generally where tubular parts such as pipes, tubings, and the like, are to be connected and where it is necessary or advantageous that they be sealed so that leakage does not occur where they are connected. The structure of the present invention is applicable, generally, to what may be termed pipe fittings such, for example, as straight couplings, reducers, T's, L's, and various other such devices. This being the case, I have, for purpose of example, illustrated in Fig. 1 of the drawings a single manifold or assembly wherein pipe parts or the like are joined by various fittings such as I have just named, and each of the fittings embodies the present invention. The reducer, T-fitting and L-fitting shown in Fig. 1 are shown in simple form, that is, without the gripper which is in the nature of an attachment supplementing the action of the joint itself, it being apparent, however, that the grippers shown as applied to the straight coupling appearing in Fig. 1 may, in like manner, be applied to either or both ends of any or all of the fittings illustrated.

In describing the present invention I will refer to it as involving or including a tubular body and from the various forms of the invention shown in Fig. 1 of the drawings it will be apparent that such body, though tubular, need not be uniform in size throughout its length but may vary from one end to the other, as in the case of the reducer, and it need not be a simple, straight structure as shown in the case of the reducer and straight coupling, but may be curved or deflected, as in the case of the L, and it need not be without branches or extensions, as will be apparent from consideration of the T-fitting shown in Fig. 1.

It is believed that the present invention will be fully understood from a detailed description of the straight coupling A illustrated in Fig. 1, connecting pipe parts 10 and 11, since the essential features of the invention incorporated in the straight coupling A are also included in the L-fitting B, shown connecting the pipe part 11 and the pipe part 12, and in the T-fitting C shown connecting the pipe part 12 and the pipe parts 13 and 14, and also in the reducer D shown connecting the pipe part 13 and the pipe part 15.

The coupling A shown in detail in Figs. 9 and 10 of the drawings includes, generally, a body 20 tubular in form and engaged with the connected pipe parts 10 and 11, sealing means 21 carried by and related to the body 20 to be normally held in sealing engagement with the pipe parts 10 and 11, and supplemental grippers 22 engaged with the body 20, preferably at the ends thereof, and having gripping engagement with the pipe parts 10 and 11.

The body 20 is an elongate tubular structure and in the case of a straight coupling such as is being described it is a straight tubular structure. In accordance with the invention the body is split longitudinally so that it is sectional, it being preferred that it be split diametrically so that it is in two like or equal sections X and Y.

The body, being sectional, includes means coupling the sections X and Y and preferably operable to draw or clamp them together or toward each other and into gripping engagement with the connected pipe parts 10 and 11. In the form of the invention illustrated the means coupling the sections X and Y include flange-like ears or lugs 25 projecting outward from the edge portions 26 of sections X and Y and fasteners 27 connecting the lugs and operable to clamp the sections X and Y together. In the particular form of the invention illustrated there are two lugs 25 at each edge portion 26 of each body section and the lugs are located at or near the ends of the lug sections. The fasteners 27 are shown as screw fasteners and, in practice, are preferably simple bolts engaged through registering lugs of the two body sections as shown in the drawings.

From the foregoing description it will be apparent that the body sections X and Y joined by the coupling means form a tubular structure open at its ends to receive the end portions of the pipe sections 10 and 11. The inner cylindrical wall 30 of the body A formed by the cooperating sections X and Y is preferably larger in diameter than the outside diameter of the pipe parts 10 and 11 so that an annular chamber occurs between the wall 30 and the exteriors of the pipe parts. In accordance with the present invention inwardly projecting end flanges 32 occur at the ends of the body, there being an end flange part in each of the body sections. The inner or edge portions 33 of the flanges 32 are shaped to engage and fit snugly around the exteriors of the pipe parts 10 and 11. In practice it is preferred that the sections X and Y be so proportioned that their edge parts 26 with their projecting lugs 25 do not contact or come together when the body sections are assembled around the pipe sections 10 and 11, but do closely approach each other so that as the fasteners 27 are operated or tightened the body is caused to grip or clamp onto the pipe parts 10 and 11 forming a secure, firm, metal to metal engagement between the body sections and the pipe parts, which engagement is such as to hold the pipe parts 10 and 11 against movement relative to each other or relative to the fitting under most ordinary conditions.

Outwardly projecting end flanges 40 are provided at the ends of the body or at the ends of the body sections X and Y, which flanges 40 are preferably located outward of or in line with the inwardly projecting flanges and serve to effectively stiffen and reinforce the end portions of the body where the clamping action occurs. In practice it is desirable that the outwardly projecting flanges 40 be so formed and related to the lugs 25 as to join therewith, as shown in the drawings.

The sealing means 21 provided by the present invention serves to provide a tight secure dependable fluid-tight seal between the sectional body and each of the pipe parts engaged with the body, and in its preferred form it involves a single, simple, unitary tubular element formed by a simple straight tube or sleeve 50 having collar-like parts 51 at its ends. The element or unit forming the sealing means 21 is preferably an elongate part corresponding in length with the space between the inner sides 34 of flanges 32 so that it may be engaged in the annular chamber formed within the cylindrical wall 30 and between the sides or walls 34.

In the preferred form of the invention the element forming the sealing means is formed of rubber or a rubber-like material such as any one of several well known rubber substitutes of the type commonly employed in packings, and the like. For most services it is preferred to employ a rubber or rubber-like material having about 50 to 60 durometer hardness.

In the preferred form of the invention the sleeve 50 of the sealing element has an opening 60 through it with a diameter substantially the same as the outside diameter of the pipe part or parts to be engaged therein. Where the pipe parts are of like diameter, as shown in Fig. 9, the sleeve 50 is of uniform inside diameter from one end to the other, whereas if the fitting is a reducer such as the reducer D, shown in detail in Figs. 7 and 8, the sleeve is different in diameter at its two ends. The exterior 61 of the sleeve 50 has a diameter substantially the same as the cylindrical opening defined by the wall 30 of the body.

The collars 51 of the element forming the seal are preferably located at or confined to the end portions of the seal so that they occur at the ends of the sleeve 50 and adjacent the walls 34 of the end flanges 32 of the body. Each collar 51 is in the nature of an enlargement on or at the end of the sleeve and is preferably in the form of an inwardly projecting flange-like part with a convex face 65 having sealing engagement with the exterior pipe part. When I refer to the exterior or face 65 of the sealing collar being convex, I am describing the condition in which it occurs as formed and not as it occurs when the structure is in operation as shown in Fig. 9.

When the structure is engaged or is in operation, as shown in Fig. 9 of the drawings, the sealing collars or flange-like parts 51 at the ends of the sleeve 50 are compressed and deformed so that these parts of the sealing element are under substantial compression and of about the same size and shape as is the sleeve 50 under normal conditions. Under the compression that occurs when the structure is set or engaged, as shown in Fig. 9, the material of the seal flows somewhat and tends to fill into any crack or crevice that may occur either between the sections of the body or between the flanges 32 of the body and the pipe parts. Further, during operation of the structure any pressure from within the pipe parts tending to escape between the seal and the pipe parts merely tends to crowd or press the seal out in any cracks or crevices that may occur, to the end that the seal tightens and positively prevents leakage.

A significant feature of the unitary rubber or rubber-like element forming the sealing means 21 is that it is a simple tubular part so pliable that it can, if necessary, be manipulated or worked into position over opposing end portions of pipe parts without shifting the pipe parts axially relative to each other so long as there is a slight gap between the ends of the pipe parts. A typical application of a sealing sleeve to pipe parts preliminary to the body of the structure being arranged in place is shown in Fig. 8 of the drawings.

Grippers 22 such as are shown at the straight coupling A in Fig. 1, and also in Figs. 9 and 10, are in the nature of accessories or attachments that may or may not be used, as circumstances require, and they are parts that can be applied to either or both ends of any of the fittings provided by the present invention.

Each gripper is shown as involving a split ring-like body 70 to be operated by one or more screw devices 71 so that the ring-like part clamps tightly onto a pipe part at a point just beyond one end of the fitting body 20. In the case illustrated in the drawings the ring of the gripper is sectional, that is, it is formed in two halves, each of which has projecting lugs 72 that receive and carry the operating devices 71 which are shown as bolts. The inner or gripping faces 73 of the ring parts may be roughened or provided with teeth, as shown in the drawings, so that a positive gripping engagement is established between the ring part and the pipe part engaged therethrough.

Each gripper has, in addition to the ring which is applicable to the pipe part, one or more hook-like jaws 80 shaped and proportioned to have gripping engagement with an outer end flange 40 of a body part or section. In the case illustrated the jaws 80 are shown as segmental parts overlying the flanges 40 and each jaw has an inwardly projecting lip 82 which engages behind a flange 40 as clearly shown in Fig. 9. In the preferred construction the ring structure of each clamp has an end face 83 which abuts the outer end 84 of the body 20 so that when the gripper is applied, as shown throughout the drawings, it positively holds the body 20 against axial movement in either direction on the gripped pipe part.

From the foregoing description it will be apparent how grippers may be advantageously applied at each end of a body 20 so that the ends of the body are securely coupled to the pipe parts which are also gripped by the flanges 32 of the body.

From the foregoing description it will be apparent that the features of construction, and that the gripping and sealing actions above described and which have been described particularly with reference to the fitting A, shown in detail in Figs. 9 and 10, are equally applicable to the fittings B, C and D, and it will be apparent that in practice various modifications and variations may be made in adapting the invention to various special or different circumstances, as conditions arise.

Having described only typical preferred forms and applications of my invention, I do not wish to be limited or restricted to the specific details herein set forth, but wish to reserve to myself any variations or modifications that may appear to those skilled in the art and fall within the scope of the following claims:

Having described my invention, I claim:

1. A coupling for pipes including, a tubular body with a lateral extension, the body being divided through the extension for clamping onto the pipes with a pipe entering each end of the body and into the extension, the sections defining an annular chamber in the body around the pipes that are entered therein and an annular chamber around the pipe that entered in the extension, the body and extension having flanges at their ends closing the chambers, and sealing means including a sleeve of rubber-like material in the body and having a projecting part in the said extension, the sleeve and projecting part being in pressure engagement with the pipes.

2. A coupling for fluid handling pipes each with a smooth surfaced end portion including, a tubular body with end portions receiving end portions of aligned pipes and with a lateral extension between its end portions and receiving the end portion of another pipe, the body being divided in a plane central of the said pipes to be in two like sections, the sections of the body being internally recessed to define a main cylindrical chamber surrounding the end portions of the aligned pipes and a cylindrical chamber in the extension and in communication with the main chamber and surrounding the end portion of said other pipe, there being inwardly projecting flanges at the outer ends of the chambers closing the chambers and having faces fitting the exteriors of the pipes, and a T-shaped sealing member of rubber-like material having a main tubular portion the exterior of which conforms in size and shape to the main chamber and which completely fills said chamber, and a lateral tubular portion the exterior of which conforms in size and shape with the chamber in the extension and completely fills it, and clamp means releasably fastening the sections together, the ends of the said tubular portions of the sealing member being inwardly enlarged to be materially deformed when the coupling is in operation.

LORENZO KENNON.

REFERENCES CITED

The following references are of record in the file of this patent:

UNITED STATES PATENTS

| Number | Name | Date |
|---|---|---|
| 732,400 | Dresser et al. | June 30, 1903 |
| 733,995 | Profitlich et al. | July 21, 1903 |
| 982,028 | Austin | Jan. 17, 1911 |
| 1,665,810 | Gullick | Apr. 10, 1928 |
| 1,978,453 | Flynn | Oct. 30, 1934 |
| 2,041,132 | Johnson | May 19, 1936 |